United States Patent [19]

Agarwal

[11] Patent Number: 5,576,083
[45] Date of Patent: Nov. 19, 1996

[54] BLOW MOLDING RESINS

[75] Inventor: Surendra H. Agarwal, West Nyack, N.Y.

[73] Assignee: Kraft Foods, Inc., Northfield, Ill.

[21] Appl. No.: 333,814

[22] Filed: Nov. 3, 1994

[51] Int. Cl.$^6$ .............................. B65D 1/02; C08L 23/04; C08L 23/06
[52] U.S. Cl. ...................... 428/36.92; 428/35.7; 525/240
[58] Field of Search .................... 525/240; 428/36.92, 428/35.7

[56] References Cited

U.S. PATENT DOCUMENTS

| | | | |
|---|---|---|---|
| 3,125,548 | 3/1964 | Anderson | 525/240 |
| 3,231,636 | 1/1966 | Snyder et al. | 525/240 |
| 3,998,914 | 12/1976 | Lillis et al. | 525/240 |
| 4,790,676 | 12/1988 | Karatsu et al. | 525/240 |
| 5,076,452 | 12/1991 | Hashimoto | 215/1 A |
| 5,153,039 | 10/1992 | Porter et al. | 428/36.92 |
| 5,188,250 | 2/1993 | Kovacic et al. | 215/32 |
| 5,268,230 | 12/1993 | Edwards | 428/409 |
| 5,278,272 | 1/1994 | Lai et al. | 526/348.5 |
| 5,292,241 | 3/1994 | Fang et al. | 425/289 |
| 5,330,808 | 7/1994 | Duff et al. | 428/36.92 |

FOREIGN PATENT DOCUMENTS

| | | |
|---|---|---|
| 1043639 | 3/1986 | Japan . |
| 64-87226 | 3/1989 | Japan . |
| 5310241 | 11/1993 | Japan . |

OTHER PUBLICATIONS

Modern Plastics Ency. 1984–1985 pp. 64.
Technical Data Sheet—High Density Polyethylene Injection Molding Resin, Chevron Chemical Company, Aug. 1993.
Technical Data Sheet—Low Density Polyethylene Extrusion Coating Resin, Chevron Chemical Company, Aug. 1993.

*Primary Examiner*—Carman J. Seccuro, Jr.
*Attorney, Agent, or Firm*—Thomas R. Savoie; Thomas A. Marcoux

[57] ABSTRACT

High density polyethylene resins are produced for use in manufacturing blow-molded, pliable containers. Combinations of (1) injection molding grade of HDPE and extrusion coating grade of LDPE or (2) blow-molding grade of HDPE and extrusion-coating grade of LDPE are useful to produce the resins of this invention.

3 Claims, No Drawings

BLOW MOLDING RESINS

FIELD OF THE INVENTION

The present invention relates generally to polyethylene resins which are useful for the production of blow-molded containers and which have a density in excess of 0.940 g/cc.

BACKGROUND OF THE INVENTION

Blow-molded polyethylene containers may be produced using low-density (i.e., density below 0.94 g/cc) polyethylene resins (LDPE). Typically the density of these resins is about 0.92 g/cc and these resins have a broad molecular weight distribution (MWD). These containers have a soft feel, are quite pliable (i.e., squeezable) and can be easily grasped by young children. Presently, however, recycling systems for LDPE containers are not widely available.

Blow-molded polyethylene containers may also be produced using high-density polyethylene resins (HDPE) (i.e., having a density of 0.94 or greater) having a melt index of less than 1.0. These HDPE containers, although readily recyclable, have a stiff feel and are not desirable for use with small, hand-held containers, such as single-serving, squeezable beverage containers.

It would be desirable to have a blow-molding resin that is, for purposes of recyclability, a high-density polyethylene and yet will produce a single-serving sized beverage container that is soft and flexible. Further, it would be desirable if such resins enabled easy trimming of flash from the molded pieces even with the use of blow-molding machines having limited clamping force, such as about 500 kg (less than 1.0 ton). Still further, it would be desirable if these resins enabled the use of the easy twist-off opening features which are commonly incorporated in one-piece, blow-molded, single-serving beverage containers. These opening features desirably separate when rotated less than 90° using a force of about one pound or less Blow-molded beverage containers of the type shown in U.S. Pat. Nos. 5,280,844 to Kaufman et al., U.S. Pat. No. 5,188,250 to Kovacic et al. and U.S. Pat. No. 5,076,452 to Hashimoto et al., all of which are hereby incorporated by reference, are examples of containers which have twist-off opening features and which may be advantageously produced with the blow-molding resins of this invention.

DESCRIPTION OF THE INVENTION

The polyethylene resins of this invention will have a density of from 0.94 to 0.96 g/cc, preferably 0.942 to 0.948 g/cc, at melt index of from about 2.0 to about 6.5, preferably from 4.0 to 6.0, and a broad molecular weight distribution of at least 4, preferably from 4 to 8. These resins may be formulated by dry blending or melt blending from in excess of 50% to 80% by weight of injection-molding-grade, HDPE having a melt index of at least 1.0, preferably 3.0 to 9.0, a density of from 0.95 to 0.96 g/cc, preferably 0.955 to 0.960 g/cc and from 20 to 50% by weight of extrusion coating grade, LDPE having a density of from 0.91 to less than 0.94 g/cc, preferably 0.92 to 0.93 g/cc, a melt index of from about 3.0 to 7.0, preferably 4.0 to 6.0 and a molecular weight distribution of at least 4.0. Surprisingly, the higher melt strength of the LDPE apparently allows the injection-molding-grade of HDPE to be blow-molded.

In lieu of utilizing injection-molding grade of HDPE it would be possible to utilize a like amount of blow-molding-grade linear HDPE. Typically having a density of 0.950 to 0.965 g/cc, a melt index of less than 1.0 and broad MWD of at least 4.

Molecular weight distribution (MWD), or polydispersity, is a well-known variable in polymers. The molecular weight distribution, sometimes described as the ratio of weight average molecular weight ($M_w$) to number average molecular weight ($M_n$) (i.e., $M_w/M_n$) can be measured directly (e.g., by gel permeation chromatography techniques) or more routinely, by measuring $I_{10}/I_2$ ratio, as described in ASTM D-1238. For linear polyolefins, especially linear polyethylene, it is well-known that as $M_w/M_n$ increases, $I_{10}/I_2$ also increases.

The term "melt index" or "$I_2$" defines a value measured in accordance with ASTM D-1238 (190° C./2.16 kg); "$I_{10}$" is measured in accordance with ASTM D-1238 (190° C/10 kg).

The elastic, linear polyethylene polymers of this invention possess a unique combination of properties which makes them highly suitable for use in the production of single-serving, blow-molded, beverage containers. The containers produced with the resins of this invention are readily recycled as the polyethylene has a density in excess of 0.94 g/cc and is classified as high-density polyethylene. The resins of this meet SPI (The Society of The Plastic Industry) protocol for a recycling code of No. 2, as the density of the blend is more than 0.940 and HDPE constitutes more than 50% of the resin blend. The containers, however, are pliable and easily grasped by young children and are not stiff as is normally the case with blow-molded, HDPE containers. Containers produced in accordance with this invention which have twist-off opening features are easily opened by young children as the opening occurs with a relatively low extent of twisting while using a relatively low amount of force. Specifically, opening of the container can be effected with a twisting motion of less than 90°, using a force of less than pounds. Opening of these containers is achieved without stress-cracking at the twist-off.

The resin of this invention has enough wider MWD so that it can be easily blow-molded, even on blow-molding equipment, where the mold halves have a limited clamping force of less than 500 kg (less than one ton). Stripping of flashing from the molded pieces produced by low clamping force molding equipment is greatly enabled with the resins of this invention.

In order to achieve the desired flexibility for the containers, the wall thickness of the container should be from 0.15 cm (0.006 inch) to 0.038 cm (0.015 inch).

This invention is further described but not limited by the following example:

EXAMPLE

A physical blend of 56% by weight of injection-molding grade of HDPE and 44% by weight of extrusion coating grade of LDPE was prepared. The HDPE had a density of 0.962 g/cc a melt index of 6.5 g/10 minutes and a MWD of 3.5 to 4.0. The LDPE had a density of 0.923 g/cc, a melt index of 5.0 and a MWD of 5. A melt blend of these two resins produced a resin having a density of 0.945 g/cc, a melt index of 4.8 g/10 minutes and a MWD or 4.5–5 . The resin blend was used to produce the blow-molded bottles shown and described in the aforementioned Kovacic et al. patent. The molding equipment was a rotary blow molder with a mold clamping force of 453.5 kg. Flashing was readily stripped from the stream of bottles exiting the rotary blow-molder. The bottle had a minimum wall thickness of 0.006 inches (0.15 mm) and had the pliable feel of LDPE. The bottles were opened by twisting the closure a distance of 90° with a force of less than one pound.

Having thus described the invention what is claimed is:

1. A soft and flexible blow-molded bottle produced from a resin having a density of from 0.94 to 0.96 g/cc, a melt index of from 2.0 to about 6.5 and a broad molecular weight distribution of at least 4, said resin being comprised of from 50% to 80% of injection molding grade HDPE having a density of from 0.95 to 0.96 g/cc and a melt index of from 3 to 9 and from 20% to 50% of extrusion coating grade LDPE having a density of from 0.91 to less than 0.94 g/cc and a melt index of at least 1.0.

2. The blow-molded bottle of claim 1 wherein the wall thickness of the bottle is from 0.015 to 0.038 cm.

3. The blow-molded bottle of claim 1 wherein the melt index of the resin blend is from 4.0 to 6.0.

* * * * *